United States Patent

[11] 3,628,233

| [72] | Inventor | John J. Sowko, Sr. |
| | | Bethel Park, Pa. |
| [21] | Appl. No. | 873,697 |
| [22] | Filed | Nov. 3, 1969 |
| [45] | Patented | Dec. 21, 1971 |
| [73] | Assignee | Carmet Company |
| | | Pittsburgh, Pa. |

[54] METHOD FOR THE LOW-TEMPERATURE JOINING OF CARBIDES
4 Claims, No Drawings

[52] U.S. Cl. .......................................................... 29/473.1,
29/504
[51] Int. Cl. ....................................................... B23k 31/02
[50] Field of Search ........................................... 29/473.1,
494, 504

[56] References Cited
UNITED STATES PATENTS

| 3,001,269 | 9/1961 | Moore et al. ................. | 29/473.1 X |
| 3,034,205 | 5/1962 | Ames .......................... | 29/473.1 X |
| 3,058,210 | 10/1962 | Winters ....................... | 29/472.7 |
| 3,110,571 | 11/1963 | Alexander ................... | 29/473.1 X |
| 3,372,464 | 3/1968 | Vincent et al. .............. | 29/473.1 |

FOREIGN PATENTS

| 573,201 | 11/1945 | Great Britain ............... | 29/473.1 |

OTHER REFERENCES
Soldering Manual, American Welding Society Publication, copyright 1959, p. vii of Introduction.
Welding Handbook, American Welding Society Publication, copyright 1963, pp. 1.4 to 1.7.

*Primary Examiner*—John F. Campbell
*Assistant Examiner*—Ronald J. Shore
*Attorneys*—Richard A. Speer, Vincent G. Giola and Howard R. Berkenstock, Jr.

ABSTRACT: Described herein is a method of joining metal carbides from the group consisting of tungsten carbide, tantalum carbide and titanium carbide which permits the use of low-silver, alloy solder at brazing temperatures under about 800° F.

METHOD FOR THE LOW-TEMPERATURE JOINING OF CARBIDES

Frequently, it is necessary that components of carbides, such as tungsten carbide, tantalum carbide and titanium carbide must be joined to a metal article in order to increase wear or abrasion resistance of more easily eroded materials. These carbides normally cannot be joined to other materials or to similar materials at low temperatures of under about 800° F. since the brazing material commonly employed will not adhere to the carbide. In practice, carbides are brazed to metal components by using brazing materials of high-silver content; e.g., 35 to 50 percent silver, or copper at temperatures ranging from about 1,100° F. to 2,000° F.

As a practical matter, brazing of the aforementioned carbides at elevated temperatures with the brazing materials heretofore employed, presented a number of difficulties. The use of high temperatures heretofore necessary for brazing carbides frequently was responsible for imparting thermal stresses in the components, including the supporting structure for the carbide. These stresses can lead to premature failure. Furthermore, the relatively high cost of the alloy solders containing greater amounts of silver is also a serious handicap. The necessity for using high temperatures in brazing carbides makes it impossible to employ certain metals with the carbides, since some metals may not be exposed to the high brazing temperatures without the loss of properties or other undesirable side effects.

It has now been discovered that carbides of titanium, tantalum and tungsten may be satisfactorily joined to metal components at temperatures of less than about 800° F., preferably less than 500° F., and with solders containing low-silver contents. In accordance with the invention, the carbide is heated to an elevated temperature in the range of 1,950° to 2,250° F. then cooled to room temperature in a manner heretofore known in the art to increase wettability and thereafter, the carbide is joined to a metal component by melting a low-silver, alloy solder containing less than 10 percent silver, preferably less than 5 percent silver, at a temperature less than about 800° F. in contact with the carbide and an adjoining metal component after which the assembly is cooled to effect a bonded joint.

The following example will illustrate a presently preferred embodiment of the invention. In a typical application utilizing the process of the invention to facilitate brazing of carbides to metal components, tire studs were manufactured by assembling a tungsten carbide insert within a steel supporting component, using a low-silver alloy containing 1½ percent silver, as solder, and the assembly was heated to about 450° F. The carbide had previously been heated in the range of 1,950° to 2,200° F. and cooled from temperature in a nonoxidizing environment to increase wettability of the carbide surface. Specifically, salt baths are useful to accomplish the heating and cooling. After effecting a bonded joint between the carbide and the steel component, the assembly was cooled. It was found that the carbide and metal component was firmly joined. A similar technique was employed in joining carbide components in scrap choppers for chopping scrap sheet and in bonding to heavy duty steelplate.

Other applications to which the invention is particularly well suited are for the wear parts at power plants, cement plants, foundries, food industry plants, paper plants and steel mills.

It is readily apparent from the foregoing that the invention is susceptible to a wide variety of applications. It is also noted, that various changes and modifications may be made without departing from the invention. Accordingly, the scope thereof should be limited only by the appended claims wherein what is claimed is:

I claim:

1. A method of joining metal carbide from the group consisting of tungsten carbide, tantalum carbide and titanium carbide at temperatures less than about 800° F. which comprises heating said carbide to a temperature of 1,950° to 2,200° F. and cooling in a nonoxidizing atmosphere; brazing said carbide to a metal component by melting a low-silver, alloy solder containing less than 10 percent silver at a temperature less than about 800° F. and thereafter cooling to effect a bonded joint.

2. A method according to claim 1 wherein said silver, alloy solder contains less than 5 percent silver.

3. A method according to claim 2 wherein said silver alloy contains about 1½ percent silver.

4. A method according to claim 1 wherein said joining temperature is less than about 500° F.

* * * * *